March 23, 1926.

C. A. JUENGST

TRIMMER FEEDER

Filed May 16, 1923

INVENTOR
CHARLES A. JUENGST
BY
Philip Lekh
ATTORNEY

March 23, 1926.
C. A. JUENGST
1,577,644
TRIMMER FEEDER
Filed May 16, 1923    4 Sheets-Sheet 3
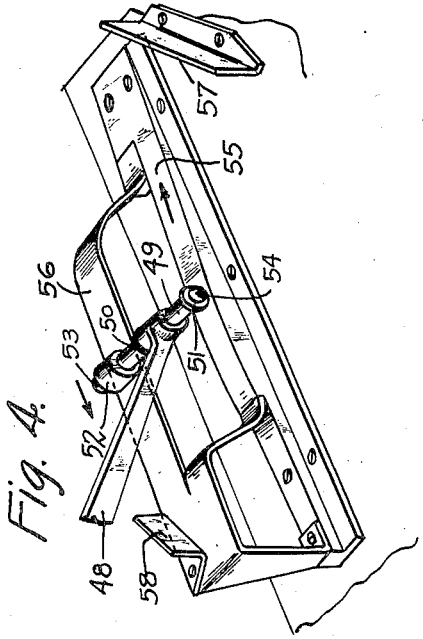
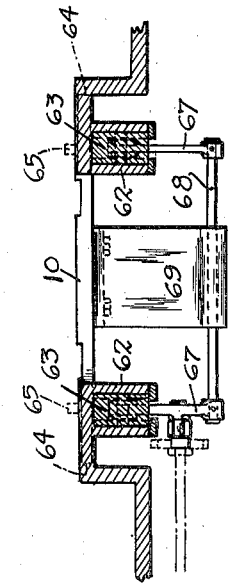
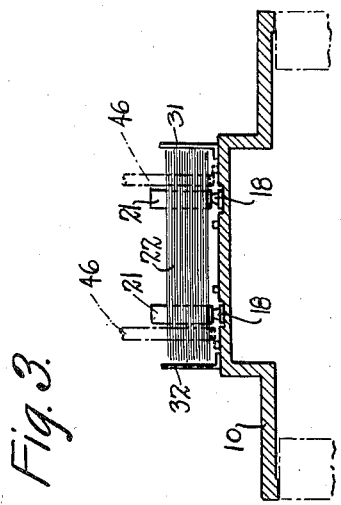
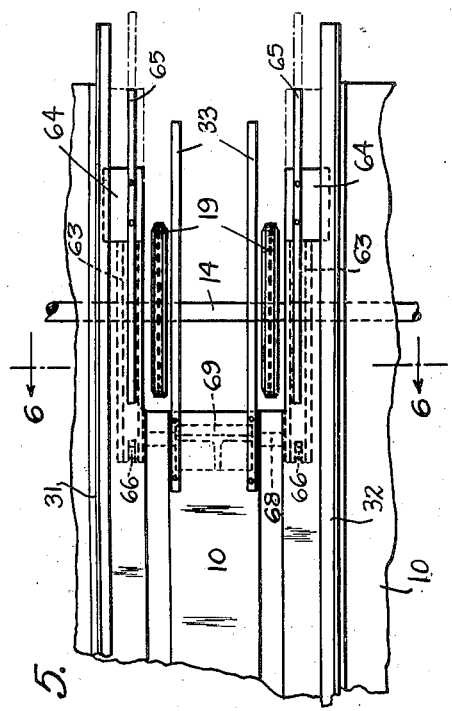
INVENTOR
CHARLES A. JUENGST
BY
Philip Reck
ATTORNEY March 23, 1926.
C. A. JUENGST
1,577,644
TRIMMER FEEDER
Filed May 16, 1923
4 Sheets-Sheet 4
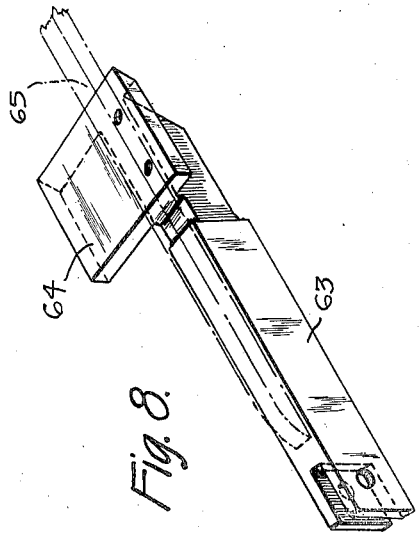
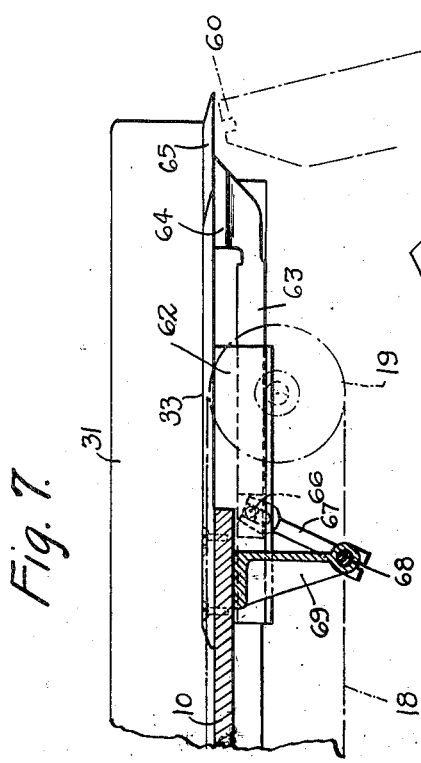
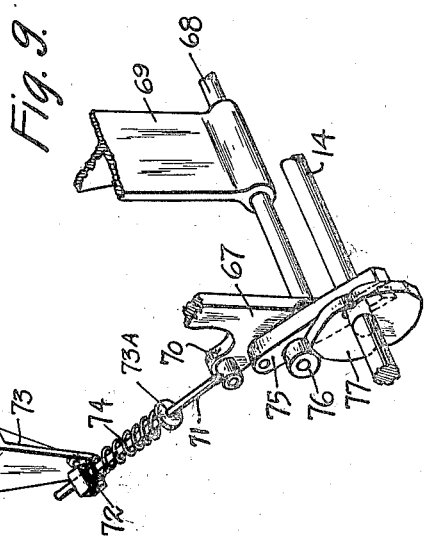
INVENTOR
CHARLES A. JUENGST
BY
Philip B. Fick
ATTORNEY Patented Mar. 23, 1926.

1,577,644

UNITED STATES PATENT OFFICE.

CHARLES A. JUENGST, OF CROTON FALLS, NEW YORK, ASSIGNOR TO AMERICAN ASSEMBLING MACHINE COMPANY, OF MEMPHIS, TENNESSEE, A CORPORATION OF DELAWARE.

TRIMMER FEEDER.

Application filed May 16, 1923. Serial No. 639,452.

*To all whom it may concern:*

Be it known that I, CHARLES A. JUENGST, a citizen of the United States, and a resident of Croton Falls, in the county of Westchester and State of New York, have invented certain new and useful Improvements in Trimmer Feeders, of which the following is a specification, reference being made to the accompanying drawings, forming a part thereof.

My invention relates more particularly to that type of automatic feeders used in conjunction with automatic book trimming machines, but my improved trimmer feeder may be also employed with other types of machines to which stock or material is to be successively advanced to different forms of devices for cutting or otherwise acting thereon which imperil the attendant when feeding same by hand.

Automatic book trimming machines as now built and operated are usually equipped with an automatic feeder timed to feed separate stacks of books to the vertically reciprocating trimming knives which cut the edges of the book. It is quite essential that the attendant shall supply the book-pads at a considerable distance from the first trimming knife, and that during the operation of the feeder such attendant shall not be forced to place his hands at any time throughout the cycle in the plane of first trimming knife which reciprocates at regular intervals in cutting the front edges of the successive books.

The chief objects of my invention are, among other things, to provide an improved and simplified book-feed mechanism which shall simulate, so far as possible, throughout the cycle of its operation, the rapid and deft movements of an expert hand-feeder as he would forward and present the successive book-pads to the action of the first trimming knife; also to provide a feeder which shall be rapid, unfailingly accurate and efficient in forwarding and presenting the books upon the cutting-bed and table and against the usual stop gages by which their position relatively to to first trimming knife is fixed; to provide improved devices which shall forward the books when placed by the attendant on the carrier particularly devised to travel at a constant speed; and furthermore to provide a novel and simplified mechanism for imparting an intermittent and gradually accelerated movement to the successive book-pads as they are taken and advanced from the carrier moving at a uniform rate of travel, which shall in no way disarrange the several books stacked in vertical alinement upon one another preparatory to positioning same with a gradually retarded movement upon the cutting-bed and against the stop gages, or in proper position to the trimming plane of the knife which cuts the front edges of the books.

A further object of my invention is to provide a forwardly movable table bridge with improved means for projecting same forwardly in unison with reciprocating feeding push fingers which carry the book-pads to the trimmer with an accelerated movement. Such bridge is also arranged to be moved rearwardly during the subsequent trimming operation so that the paper trimmed from the front edges of the books may fall to the floor through the transverse opening provided to the rear of the oscillating cutting bed for the first trimmer knife.

Further objects and advantages will hereinafter be set forth and be particularly pointed out in the claims; my improved trimmer may be applied either in the preferred form herein shown or in various modified forms to fit the conditions in different types of machines to which it may be installed.

Of the drawings, Fig. 1 is a side elevation of the preferred form of my trimmer feeder, a part being broken away to show the conveyor chains used for carrying the book-pads thereafter to be advanced beyond the first trimming knife (shown in outline) of the book trimming machine to which the feeder is attached;

Fig. 3 is a sectional view on a slightly reduced scale taken on the line 3—3 of Fig. 2 looking in the direction of the arrow;

Fig. 4 is a perspective view of the push finger lever and the cam-runways through which such lever is reciprocated;

Fig. 5 is a top plan view of forward end of the feeder showing the table bridge in retracted position, with its forward bridging position shown in dotted outline;

Fig. 6 is an enlarged sectional view taken on the line 6—6 of Fig. 5 looking in the direction of the arrow;

Fig. 7 is a sectional elevation taken on the line 7—7 of Fig. 2 showing in detail the table bridge in its forward or extended position;

Fig. 8 is a prospective view of one of the members forming the table bridge; and Fig. 9 is a perspective view of the table bridge operating cam and also of the spring which acts to advance the table bridge when released by the cam.

Similar numerals refer to similar parts throughout the several figures.

Figure 1:
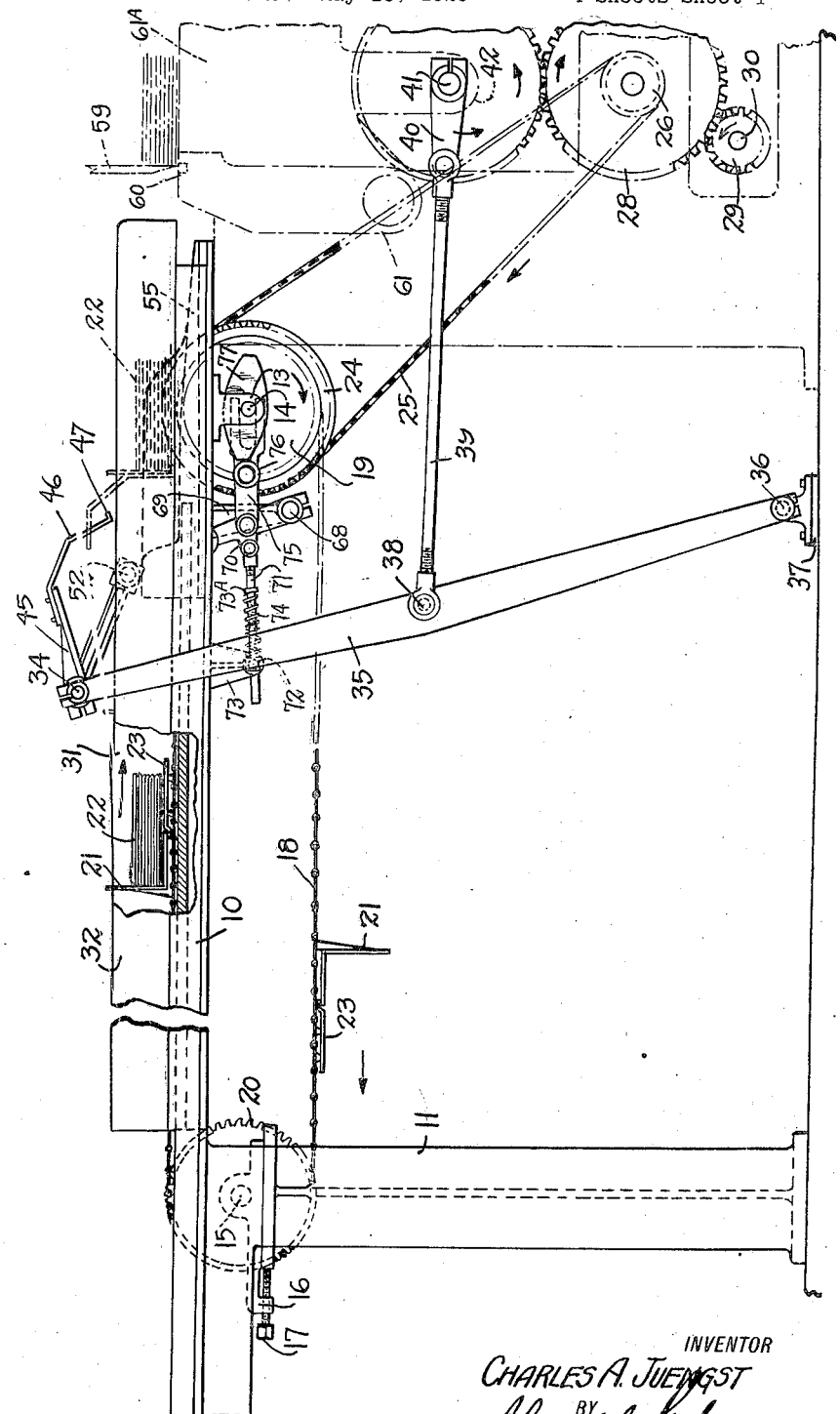
Figure 2:
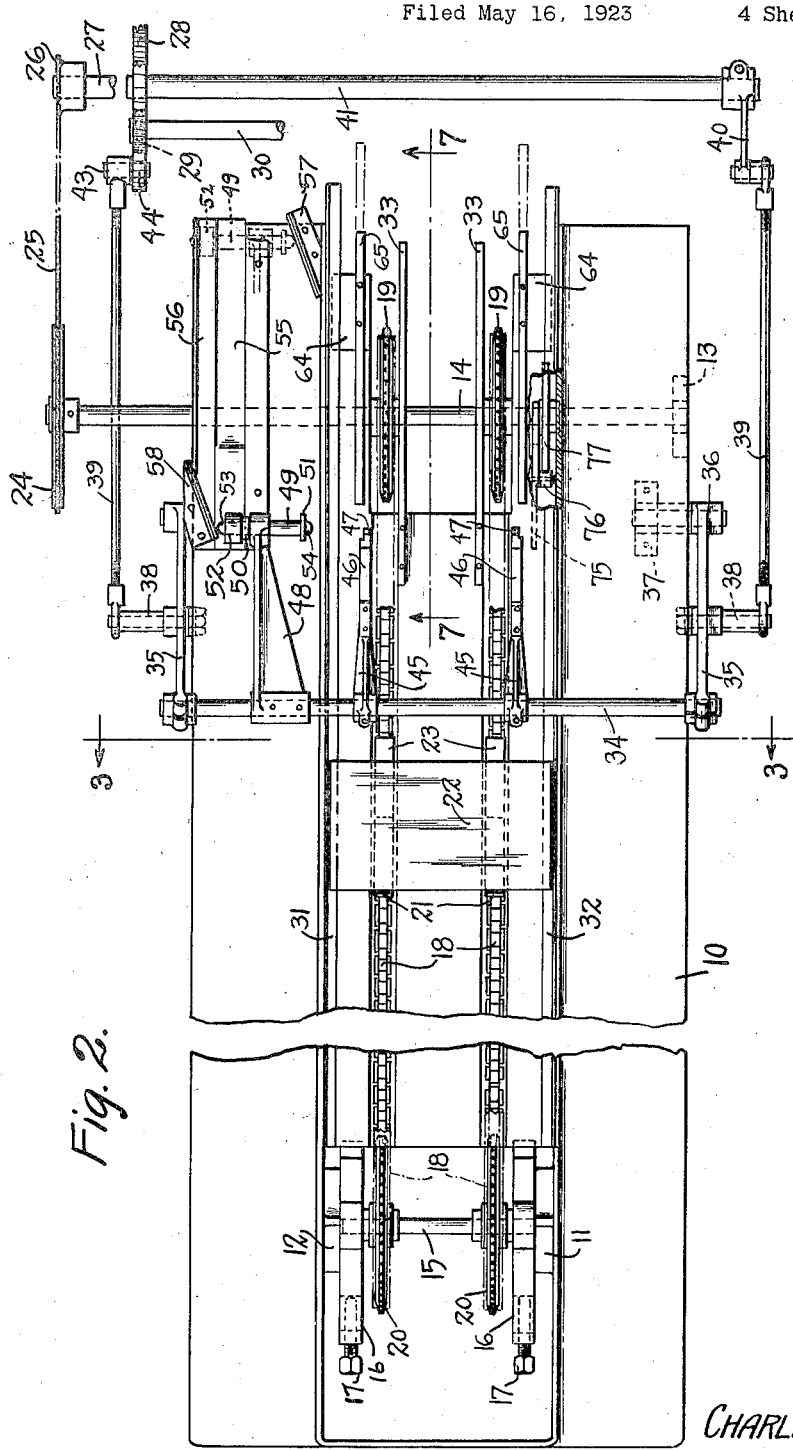
Fig. 2 is a top plan view of the same.

Referring to the drawings and more particularly to Figs. 1 and 2, the table 10 for the trimmer feeder is supported upon standards 11 and 12, and the brackets 13 form bearings for the shaft 14, while the shaft 15 journalled in slidably mounted bearings 16 may be adjusted by the set screws 17 to maintain taut the pair of mutually parallel conveyor chains 18 passing over the pairs of sprockets 19 and 20 mounted on the shafts 14 and 15 respectively. At reguler spaced-apart intervals the conveyor chains 18 have hinged thereto L-shaped supports 21 for the book-pads 22 which also rest partially on the flat plates 23 likewise pivotally secured to the chains 18 in any suitable manner. The conveyor supports 21 and plates 23 are fully as wide as the chains 18 as shown in Fig. 2, and are so disposed at regular intervals thereon that the front edges of the book pads to be trimmed will rest against the supports 21 as shown. The conveyor chains 18, comprising the carrier for the successive book-pads, are actuated at a uniform speed in the direction shown by the arrows in Fig. 1 by means of the sprocket 24 pinned to the end of the shaft 14 driven by the sprocket chain 25 training around the sprocket 26 secured to the stub-shaft 27 which also carries the gear 28 meshing with the spur pinion 29 mounted on the main drive shaft 30. Arranged on either side of and above the conveyor chains 18 are vertically disposed side guides 31 and 32 adjustably secured to the table 10 to form an elongated book race, the adjustment allowing for book-pads of different sizes. Secured to the forward end of the table 10 between the sprockets 19 are the extension rails 33 to form a supporting track for the book-pads 22 as they are carried beyond the sprockets 19 and out of the path of the chains 18 and supports 21 by mechanism which will now be described.

Such mechanism includes novel means for imparting an intermittent and gradually accelerated movement to the successive book-pads 22 forwarded by the continuously running conveyor chains 18 over the extension rails 33 to position same upon the cutting-bed and against the usual stop gages in the book trimming machine proper preparatory to trimming their front edges. Such mechanism comprises the cross-bar 34 journalled in the upper ends of lever arms 35 set on opposite sides of the machine and journalled at their lower ends on stub shafts 36 secured in the bed plates 37 on the base of the frame work of the feeder. Between their ends the lever arms 35 carry the stub-shafts 38 which are pivotally connected by the links 39 on one side to the crank arm 40 secured to the cross-shaft 41 journalled in the depending brackets 42 (Fig. 1) and on the other side to the crank-pin 43 carried by the gear 44 which enmeshes with, and is driven by, the gear 28 in the direction shown by the arrows in Fig. 1.

Adjustably secured to the cross-bar 34 and projecting forwardly are two brackets 45 each provided with a downwardly extending push finger 46 arranged adjacent and outside the pair of conveyor chains 18 as shown in Figs. 2 and 3 with the projecting finger tips 47 slightly below the plane of the supports 21 to slide beneath the front edges of the lowermost book in the stack of book-pads 22 as shown in Fig. 3. In order to engage the successive book-pads continuously fed forwardly by the chains 18 on the conveyor supports 21 and then intermittently advance same at a higher and gradually accelerated speed in synchronism with the movements of the first trimmer knife, the push fingers 46 should impart a comparatively rapid forward movement to the book-pads 22 lying in the plane of the chains 18 and also of the extension rails 33; as soon as such book-pad so advanced by the push fingers 46 has been positioned on the cutting bed and against the stop gages, the push fingers must be immediately retracted and raise to clear the trimmer knife as well as the next book-pad which is being continually forwarded by the chains 18 towards its position on the rails 33, after which the fingers 46 must be quickly lowered behind this next book-pad for subsequent accelerated feeding to the trimmer proper.

The means provided for imparting this movement to the push fingers 46 is best shown in Figs. 2 and 4; the forwardly projecting cam-lever 48 pinned to the cross-bar 34 carries in its forward end the spindle 49 slidably mounted to have a transverse movement which is predeterminedly limited by the bushings 50 and 51 mounted thereon. The spindle 49 also carries the cam-roller 52 between the bushing 50 and button 53 attached to one end of the spindle, while the button 54 is mounted on the opposite end as shown in Fig. 4. Suitably secured to a plate affixed to the table 10 are the mutually parallel forward cam-runway 55 and the return cam-runway 56, over which travels the cam-roller 52 when the cross-bar 34 and cam-lever 48 are reciprocated as has been hereinbefore described. Adjacent the forward end of the cam-runway 55 and affixed to the table 10 is the angle guide 57 against which the button 54 slidingly contacts to shift sidewise the spindle 49 in the end of the lever 48 to carry the cam-roller 52 from the forward runway 55 to the front end of the return cam-runway 56; also adjacent the rear end of the runway 56 and affixed thereto as shown in Fig. 4 is the oppositely disposed angle guide 58 against which the button 53 slidingly contacts during the latter part of the retractive run of the spindle 49 to shift the latter in the lever 48 whereby the cam-roller 52 is correspondingly shifted from the runway 56 to the rear end of the runway 55. By this mechanism the cam-roller 52 is caused to travel in a substantially rectangular path in its successive cycles of operation. The push fingers 46, therefore, when lowered behind the book-pads 22 and supports 21, are advanced in their lower plane of travel while the cam-roller 52 travels along the lower portion of the forward runway 55; such push fingers 46 are lifted and maintained in their raised position as the cam-roller travels along the main high portion of the cam-runway 56 during the major part of the return movement of the lever 48, the two angle guides 57 and 58 serving to successively shift the cam-roller 52 from one cam-runway to the other in the complete cycle of movement. In their forward movement the push fingers 46 move in a plane substantially coincident with the conveyor supports 21 and cutting-bed of the trimmer.

Such intermittent and accelerated feeding movement is synchronized with the trimming operation of the first trimmer knife 59 shown in outline in Fig. 1. Such knife coacts with the transverse cutting-bed 60 carried by the oscillating arm 61 as the book pad 22 rests on the cutting table 61ᴬ of the book-trimming machine against the usual stop gages (not shown), all as is well-known in such types of machines.

In order that the successive book-pads taken from the carrier chains 18 may be smoothly fed in their subsequent intermittent and gradually accelerated movement imparted by the push fingers 46, I have embodied in my trimmer feeder a reciprocating table bridge horizontally movable in relation to the extension rails 33 and conveyor supports 21 at the forward end of the feed-table 10 with means to actuate same in conjunction with the reciprocating push fingers. The table 10 carries two spaced-apart slotted guides 62 on its under side (Fig. 6) located outside the pair of sprockets 19 as shown in Fig. 5, within which guides are slidably mounted table bridge brackets 63, which carry at their forward ends sliding plates 64 flush with the table 10 with superposed extension rails 65, all as shown in Figs. 5, 7 and 8. The tips of the rails 65 when projected as shown in Fig. 7 form a conveyor bridge for the pads 22 advanced by the push fingers 46 as the cutting-bed 60 is swung rearwardly and out of the plane of the trimmer knife 59.

Means are provided for reciprocating the bridge brackets 63 in unison and also in synchronism with the reciprocating movements of the push fingers 46. The rear ends of the brackets 63 are forked and carry cross-pins 66 which are engaged by the upper forked ends of the rock-arms 67 affixed to the ends of the rock-shaft 68 journalled to the depending bracket 69 mounted on the under side of the feed-table 10 as shown in Figs. 6 and 7. Pivotally secured to the lugs 70 on the rock-arms 67 are the rearwardly projecting rods 71 (only one being shown in Figs. 1 and 9), the ends of which are slidably mounted in the blocks 72 secured to the brackets 73 affixed to the feed-table 10 on opposite sides of the feeder. Coiled about the rods 71 between the blocks 772 and the screw-nuts 73ᴬ are the compression springs 74 adapted, when released, to force the rods 71 to the right in Fig. 1. Pivotally secured to one of the rock-arms 67 is the arm 75 having forked ends riding on the shaft 14 as shown in Figs. 1 and 9; the arm 75 carries the cam-roller 76 which coacts with the double heart shaped cam 77 keyed to the shaft 14. The springs 74 act not only to keep the cam-roller 76 riding on the surface of the cam 77 which in turn causes the retractive movement of the bridge brackets 63 and compresses the spring 74, but also, when released by the revolving cam 77, to cause such brackets 63 to move forwardly with their rails 65 extended as shown in outline in Figs. 2 and 5. The timing of the cam 77 is such that the table bridge as a whole is advanced as the push fingers 46 move forwardly, and the full retractive movement of both push fingers and table bridge is shown in Fig. 1 with the bridge in its extreme rear position as the cam-roller 76 rides over the high part of the cam 77. At this part of the cycle the push fingers 46 are raised and retracted as shown in full lines while the trimmer knife 59 in its lowest coacting position with the cutting bed 60 thereby provides an opening between the arm 61 and table bridge to allow the shavings from the trimmer knife to drop to the floor.

The operation of my improved feeder is substantially as follows: The attendant places the successive book-pads 22 taken from the table 10 on the conveyor chains 18 in front of the supports 21 at the left end of the book race in Fig. 1 as the chains and supports start their upper forward run with the front edges of the books alined against such conveyor supports. These chains 18 are driven in unison at a constant forward speed, and the successive book-pads are carried by such conveyor chains to the dotted line position shown in Fig. 1; at this moment the push fingers 46 are held in their raised retracted position by the cam-roller 52 resting on the high part of the forward cam-runway 55. In this position the conveyor supports 21 have about reached the limit of their forward travel and the backs of the book pad 22 rest partially on the middle extension rails 33. The cross-bar 34 and lever arms 35 are then quickly swung forwardly with an accelerated movement by the links 39 by virtue of the crank-motion heretofore described, and thereupon the push fingers 46 are brought down and below the front edges of the book-pad 22 as shown in outline in Fig. 1 by the cam-roller 52 running frowardly and down off the high part of the cam-runway 55. A greatly accelerated forward movement is given to the book-pad by the push fingers 46 to clear the book-pad of the supports 21 passing around the sprockets 19, and simultaneously the cam-roller 76 rides off the high part of the cam 77 thereby releasing the springs 74 which push forwardly the table bridge brackets 63 and outer extension rails 65 which support and maintain the book-pad in an undisturbed condition as it is rapidly pushed by the fingers 46 over onto the cutting table 61ᴬ and is then delivered against the stop gages (not shown) with a gradually retarded movement; simultaneously the oscillating arm 61 carrying the cutting-bed 60 is swung forwardly as shown in outline in Fig. 1. During this part of the cycle the trimmer knife 59 is raised to allow the push fingers 46 to advance the book-pad onto the table 61ᴬ and deliver it upon the cutting bed 60. At the end of the forward stroke of the lever arms 35, the cam-roller 52 is shifted to the return cam-runway 56; as it climbs the high part of this runway 56 on the retractive movement of the lever-arms 35, the push fingers 46 are lifted and held clear as they pass over the next book-pad which has been forwarded meanwhile by the continuously running conveyor chains 18 to the extension rails 33. During this return movement the cam-roller 76 rides up the high part of the cam 77 which rocks the arms 67 rearwardly to withdraw simultaneously the table bridge brackets 63, as shown in Fig. 1, and compresses the springs 74, while the trimmer knife 59 descends as soon as the fingers 46 have been withdrawn from the plane of the trimming operation and the paper shavings from the front edges of the book pad fall through the opening shown in Fig. 1 between the arm 61 and the table bridge.

My improved feeder is simple in construction and efficient in operation, and pronounced advantages are obtained by having the conveyor chains continuously moving at a constant speed which is synchronized and coordinated with the intermittent variably accelerated movement of the push fingers which thereafter advance the successive book-pads taken from the conveyor chains along the forwardly moving table bridge rapidly, yet delivering same smoothly at a gradually retarded speed in their proper position on the cutting-bed of the trimmer in alinement with the stop gages.

My invention, in its broadest aspects, is not limited to the particular constructions shown, nor to any particular constructions or arrangements of parts by which it has been, or may be, carried into effect, since many changes and alterations may be made in the details of the structures shown without departing from the principles of the invention and without sacrificing its chief advantages.

I claim as my invention:

1. In a trimmer feeder, a cutting-bed, a conveyor having book-pad supports continuously moving substantially in the plane of the cutting-bed, and means for advancing book-pads from the moving conveyor supports at an accelerated speed, said means thereafter delivering said book-pads at a retarded speed upon the cutting-bed.

2. In a trimmer feeder, a cutting-bed, an endless conveyor having book-pad supports continuously moving at a constant speed substantially in the plane of the cutting-bed, and means for advancing book-pads from the moving conveyor supports at an accelerated speed, said means thereafter delivering said book-pads at a retarded speed upon the cutting-bed.

3. In a trimmer feeder, a cutting-bed, a conveyor having book-pad supports continuously moving substantially in the place of the cutting-bed, and means for advancing book-pads from the moving conveyor supports at a gradually accelerated speed, said means thereafter delivering said book-pads at a gradually retarded speed upon the cutting-bed.

4. In a trimmer feeder, a cutting-bed, an endless conveyor having book-pad supports continuously moving at a constant speed substantially in the plane of the cutting-bed, and means for advancing book-pads from the moving conveyor supports at a gradually accelerated speed, said means thereafter delivering said book-pads at a gradually retarded speed upon the cutting-bed.

5. In a trimmer feeder, a cutting-bed, a conveyor having book-pad supports continuously moving substantially in the plane of the cutting-bed, and means comprising reciprocating push fingers lowerable behind said moving supports for advancing book-pads from the conveyor supports at an accelerated speed, said means thereafter delivering said book-pads at a retarded speed upon the cutting-bed.

6. In a trimmer feeder, a cutting-bed, an endless conveyor having book-pad supports continuously moving at a constant speed substantially in the plane of the cutting-bed, and means comprising reciprocating push fingers lowerable behind said moving supports for advancing book-pads from the conveyor supports at a gradually accelerated speed, said means thereafter delivering said book-pads at a gradually retarded speed upon the cutting-bed.

7. In a trimmer feeder, a cutting-bed, a trimmer knife coacting therewith, an endless loop conveyor having book-pad supports continuously moving substantially in the plane of the cutting-bed, and separately actuated means moving at a greater and accelerated speed for intermittently advancing book-pads from said travelling supports, said means thereafter delivering said book-pads at a retarded speed upon the cutting-bed beyond the trimmer knife.

8. In a trimmer feeder, a cutting-bed, a trimmer knife coacting therewith, an endless loop conveyor having book-pad supports continuously moving at a constant speed substantially in the plane of the cutting-bed, and separately actuated means moving at a greater and accelerated speed for intermittently advancing book-pads from said travelling supports, said means thereafter delivering said book-pads at a retarded speed upon the cutting-bed beyond the trimmer knife.

9. In a trimmer feeder, a cutting-bed, a trimmer knife coacting therewith, an endless loop conveyor having book-pad supports continuously moving at a constant speed substantially in the plane of the cutting-bed, and separately actuated means moving at a greater and gradually accelerated speed for intermittently advancing book-pads from said travelling supports, said means thereafter delivering said book-pads at a gradually retarded speed upon the cutting-bed beyond the trimmer knife.

10. In a trimmer feeder, a cutting-bed, a trimmer knife coacting therewith, an endless loop conveyor having book-pad supports continuously moving substantially in the plane of the cutting-bed, and separately actuated means comprising reciprocating push fingers moving in parallelism with said travelling book-pad supports at a greater and accelerated speed for intermittently advancing book-pads from said travelling supports, said means thereafter delivering said book-pads at a retarded speed upon the cutting-bed beyond the trimmer knife.

11. In a trimmer feeder, a cutting-bed, a trimmer knife coacting therewith an endless loop conveyor having book-pad supports continuously moving at a constant speed substantially in the plane of the cutting-bed, and separately actuated means comprising reciprocating push fingers moving in parallelism with said travelling book-pad supports at a greater and accelerated speed for intermittently advancing book-pads from said travelling supports, said means thereafter delivering said book-pads at a retarded speed upon the cutting-bed beyond the trimmer knife.

12. In a trimmer feeder, a cutting-bed, a conveyor having book-pads supports continuously moving substantially in the plane of the cutting-bed, means for advancing book-pads from the conveyor supports at an accelerated speed, and means for supporting said book-pads independently of the conveyor while actuated by said advancing means.

13. In a trimmer feeder, a cutting-bed, a conveyor having book-pad supports continuously moving substantially in the plane of the cutting-bed, means for advancing book-pads from the conveyor supports at an accelerated speed, and means for supporting said book-pads independently of the conveyor while actuated by said advancing means, both said means moving at substantially the same speed.

14. In a trimmer feeder, a cutting-bed, a conveyor having book-pad supports continuously moving at a constant speed substantially in the plane of the cutting-bed, means for intermittently advancing book-pads from the conveyor supports at an accelerated speed, and means for supporting said book-pads independently of the conveyor while actuated by said advancing means.

15. In a trimmer feeder, a travelling conveyor having book-pad supports, means for advancing book-pads from the conveyor supports at a gradually accelerated speed, a slidable table bridge disposed in the plane of the conveyor supports, and means for actuating said table bridge in unison with said advancing means.

16. In a trimmer, a travelling conveyor having book-pad supports moving at a constant speed, means for intermittently advancing book-pads from the conveyor supports at a gradually accelerated speed, a slidable table bridge disposed in the plane of the conveyor supports, and means for actuating said table bridge in unison with said advancing means.

17. In a trimmer feeder, a travelling conveyor having book-pad supports, means for advancing book-pads from the conveyor supports at a gradually accelerated speed, a slidable table bridge disposed in the plane of the conveyor supports, and means comprising a cam controlled spring for actuating said table bridge in unison with said advancing means.

18. In a trimmer feeder, a travelling conveyor having book-pad supports, moving at a constant speed means for intermittently advancing book-pads from the conveyor supports at a gradually accelerated speed, a slidable table bridge disposed in the plane of the conveyor supports, and means comprising a cam-controlled spring for actuating said table bridge in unison with said advancing means.

19. In a trimmer feeder, a constantly moving conveyor for book-pads to be trimmed, means for advancing the successive pad from front end of the conveyor to the trimmer at a variably accelerated speed, a reciprocating cross-bar having push fingers mounted thereon, and cam-controlled devices for rocking said cross-bar to lower said push fingers behind the pad on the front end of the conveyor at the beginning of their forward movement on said cross-bar.

20. In a trimmer feeder, a constantly moving conveyor for hook-pads to be trimmed, means for advancing the successive pads from front end of the conveyor to the trimmer at a variably accelerated speed, a reciprocating cross-bar having push fingers mounted thereon, and means separate from said advancing means but actuated thereby for rocking said cross-bar to raise and lower said push fingers out of and into engagement with said book-pads when advanced to the trimmer.

21. In a trimmer feeder, a constantly moving conveyor for book-pads to be trimmed, means for advancing the successive pads from front end of the conveyor to the trimmer at a variably accelerated speed, said means comprising a pair of push fingers mounted upon a reciprocating cross-bar, and means separate from said advancing means but actuted thereby comprising a lever fixed to said cross-bar and carrying a cam-roller and a pair of coacting cam-runways fixed to the feeder to control the elevation of said push fingers for rocking said cross-bar to raise and lower said push fingers out of and into engagement with said book-pads when advanced to the trimmer.

22. In a trimmer feeder, a constantly moving conveyor for book-pads to be trimmed, means for advancing the successive pads from front end of the conveyor to the trimmer at a variably accelerated speed, said means comprising a pair of push fingers mounted upon a reciprocating cross-bar, and means separate from said advancing means but actuated thereby comprising a lever fixed to said cross-bar and carrying a shiftable cam-roller and a pair of coacting cam-runways fixed to the feeder to control the elevation of said push fingers for rocking said cross-bar to raise and lower said push fingers out of and into engagement with said book-pads when advanced to the trimmer, and means for automatically shifting said cam-roller at the end of each stroke from one cam-runway to the other.

23. In a trimmer feeder, a constantly moving conveyor for book-pads to be trimmed, means for advancing the successive pads from front end of the conveyor to the trimmer at a variably accelerated speed, said means comprising a pair of push fingers mounted upon a reciprocating cross-bar, and means separate from said advancing means but actuated thereby comprising a lever fixed to said cross-bar and carrying a shiftable cam-roller and a pair of coacting cam-runways fixed to the feeder to control the elevation of said push fingers for rocking said cross-bar to raise and lower said push fingers out of and into engagement with said book-pads when advanced to the trimmer, and inclined guides set at opposite ends of each cam-runway for automatically shifting said cam-roller at the end of each stroke from one cam-runway to the other.

24. In a trimmer feeder, a conveyor for the book-pads to be trimmed, means for intermittently advancing successive pads to the trimmer comprising a reciprocating cross-bar carrying a pair of push fingers, and means for rocking said cross-bar during its reciprocating movements to raise and lower said push fingers out of and into engagement with the pads, said last means including a lever fixed to said cross-bar, a shiftable cam-roller carried by said lever and a pair of mutually parallel cam-runways for said roller to control the elevation of the push fingers.

25. In a trimmer feeder, a conveyor for the book-pads to be trimmed, means for intermittently advancing successive pads to the trimmer comprising a reciprocating cross-bar carrying a pair of push fingers, and means for rocking said cross-bar during its reciprocating movements to raise and lower said push fingers out of and into engagement with the pads, said last means including a lever fixed to said cross-bar, a shiftable cam-roller carried by said lever, and means for shifting said roller at the end of each stroke from one cam-runway to the other.

26. In a trimmer feeder, a conveyor for the book-pads to be trimmed, means for intermittently advancing successive pads to the trimmer comprising a reciprocating cross-bar carrying a pair of push fingers, and means for rocking said cross-bar during its reciprocating movements to raise and lower said push fingers out of and into engagement with the pads, said last means including a lever fixed to said cross-bar, a shiftable cam-roller carried by said lever, and inclined guides set at opposite ends of each guideway for shifting said roller at the end of each stroke from one cam-runway to the other.

27. In a trimmer feeder, a conveyor having book-pad supports continuously moving substantially in the plane of the trimmer, means for advancing book-pads from said moving supports to the trimmer, and means for supporting said book-pads independently of the conveyor while actuated by said advancing means.

28. In a trimmer feeder, a conveyor having book-pad supports continuously moving substantially in the plane of the trimmer, means for advancing book-pads from said moving supports to the trimmer, and means for supporting said book-pads independently of the conveyor while actuated by said advancing means, said supporting means moving in unison with said advancing means.

29. In a trimmer feeder, a continuously moving conveyor having book-pad supports, means for advancing book-pads from the conveyor supports at an accelerated speed, a slidable table bridge substantially in the plane of said supports, and means for actuating said table bridge in unison with said advancing means.

30. In a trimmer feeder, a travelling conveyor having book-pad supports continuously moving at a constant speed, means for advancing book-pads from the conveyor supports, a slidable table bridge substantially in the plane of said supports, and means for actuating said table bridge in unison with said advancing means.

CHARLES A. JUENGST.